(12) United States Patent
Roth

(10) Patent No.: US 6,844,018 B1
(45) Date of Patent: Jan. 18, 2005

(54) METHOD FOR MIXING MEAT PRODUCTS TO PRODUCE A PH ADJUSTED MEAT PRODUCT

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 378 days.

(21) Appl. No.: 09/924,034

(22) Filed: Aug. 7, 2001

(51) Int. Cl.[7] ............................................... A23L 1/00
(52) U.S. Cl. .................. 426/332; 426/388; 426/646; 426/444; 426/513; 426/517; 426/518; 426/519; 426/524
(58) Field of Search ................................ 426/231, 646, 426/444, 513, 517, 518, 519, 524, 332, 388

(56) References Cited

U.S. PATENT DOCUMENTS

| | | | |
|---|---|---|---|
| 3,023,109 A | 2/1962 | Hines | 99/107 |
| 3,119,696 A | 1/1964 | Williams | 99/107 |
| 3,122,748 A | 2/1964 | Beebe, Jr. | 99/174 |
| 4,171,164 A * | 10/1979 | Groves et al. | 366/152.1 |
| 4,258,068 A | 3/1981 | Huffman | 426/272 |
| 4,733,607 A | 3/1988 | Star et al. | 99/348 |
| 4,877,623 A * | 10/1989 | Hayashi | 426/231 |
| 4,919,955 A | 4/1990 | Mitchell | 426/394 |
| 5,228,775 A | 7/1993 | Horn et al. | 366/278 |
| 5,393,547 A | 2/1995 | Balaban et al. | 426/330 |
| 5,405,630 A | 4/1995 | Ludwig | 426/231 |
| 5,433,142 A | 7/1995 | Roth | 99/474 |
| 5,564,332 A | 10/1996 | Ludwig | 99/472 |
| 5,871,795 A * | 2/1999 | Roth | 426/319 |
| 6,379,728 B1 * | 4/2002 | Roth | 426/231 |
| 6,379,739 B1 * | 4/2002 | Formanek et al. | 426/650 |
| 6,387,426 B1 * | 5/2002 | Roth | 426/319 |
| 6,406,728 B1 * | 6/2002 | Roth | 426/263 |
| 6,564,700 B2 * | 5/2003 | Roth | 99/486 |
| 6,565,904 B2 * | 5/2003 | Roth | 426/319 |
| 6,648,501 B2 * | 11/2003 | Huber et al. | 366/301 |
| 6,692,785 B2 * | 2/2004 | Roth | 426/319 |
| 6,713,108 B2 * | 3/2004 | Roth | 426/319 |

FOREIGN PATENT DOCUMENTS

| | | |
|---|---|---|
| GB | 1223159 | 2/1971 |
| JP | 62-196082 | 2/1989 |
| WO | WO9317562 | 9/1993 |

* cited by examiner

*Primary Examiner*—Drew Becker
(74) *Attorney, Agent, or Firm*—Russell D. Culbertson; The Culbertson Group, P.C.

(57) ABSTRACT

An intermediate combination is formed and then mixed to produce a final mixed product. The intermediate combination includes a first meat product preferably having a first pH and a second meat product preferably having a different pH. The first meat product in the intermediate combination comprises a plurality of pieces of the first meat product at a temperature below the freezing point of the first meat product. However, the second meat product in the intermediate combination is at a temperature at or above the freezing point of the second meat product. As the intermediate combination is then mixed, the frozen pieces of first meat product become evenly distributed in the second meat product prior to thawing and commingling with the second meat product to produce a substantially homogeneous final mixed product.

24 Claims, 2 Drawing Sheets

METHOD FOR MIXING MEAT PRODUCTS TO PRODUCE A PH ADJUSTED MEAT PRODUCT

TECHNICAL FIELD OF THE INVENTION

This invention relates to meat processing systems. More particularly, the invention relates to a method for mixing meat products to evenly distribute one meat product into another meat product to produce a final mixed product having an adjusted pH. The invention also includes an apparatus for mixing meat products.

BACKGROUND OF THE INVENTION

Adjusting the pH in a meat product may be desirable for several reasons. For example, a modifying the pH of a meat product with ammonia has been shown to inhibit microbe growth in the treated meat product and to reduce live microbe count in the treated meat product.

A pH adjustment in a meat product may be produced by treating one meat product with a pH modifying material and then mixing that treated meat product with another meat product to produce a final product having a desired adjusted pH. When mixing two meat products together having two different pH characteristics, it is desirable to ensure that the two meat products are evenly distributed in the final product to produce a uniform pH in the final product. It is also desirable to produce this generally homogeneous pH without having to work the materials excessively. Working the meat products excessively may produce undesirable characteristics in the final mixed meat product.

SUMMARY OF THE INVENTION

It is an object of the invention to provide an improved method for mixing meat products, particularly two meat products having different pH levels. It is also an object of the invention to provide an apparatus for performing this improved mixing method.

The method according to the present invention includes forming an intermediate combination and then mixing the intermediate combination to produce the final mixed product. The intermediate combination includes a first meat product having a first pH and a second meat product having a second pH. According to the invention, the first meat product in the intermediate combination comprises a plurality of pieces of the first meat product at a temperature below the freezing point of the first meat product. However, the second meat product in the intermediate combination is at a temperature at or above the freezing point of the second meat product. As the intermediate combination is mixed, the frozen pieces of the first meat product remain distinct and separate from the second meat product and thus become well distributed throughout the intermediate combination prior to thawing and commingling with the second meat product. The result of this mixing process is a more even distribution of the first meat product into the second meat product.

The pieces of the first meat product are preferably produced by forming a quantity of the first meat product into at least one elongated frozen strand of material. The frozen strand of first meat product may then be introduced into a mixer along with the second meat product. Introducing the frozen strand of material into the mixer along with operating the mixer produces bending forces in the elongated strand of material and these bending forces cause the elongated strand to break into a plurality of small pieces.

The apparatus for performing the method according to the invention includes a mixer connected to receive the first meat product and the second product. The apparatus may include a forming arrangement comprising a first freezer, a grinder/extruder, and a second freezer. The first freezer places the first meat product in a desirable condition for the grinder/extruder to form at least one and preferably several elongated strands of the first meat product. The second freezer then receives the elongated strands and freezes the strands to a desired temperature. The apparatus also may include a pH modifying arrangement for receiving an initial meat product and producing the pH adjusted meat product for the forming arrangement.

As used in this disclosure and the accompanying claims the term "meat product" will be used to describe a comminuted product that includes animal flesh such as beef, pork, poultry, or fish. The term "meat product" is not intended to imply that the product is comprised entirely of animal muscle and other animal-derived materials such as animal fat. In particular, a "meat product" according to the invention may include non meat fillers, spices, and other materials which are not themselves meat products. Also, the "freezing point" of a meat product means the temperature at which ice crystals begin to form in the particular meat product at a given pressure. At any temperature below the freezing point of the meat product, the meat product will contain substantially all ice crystals and substantially no liquid water. At any temperature above the freezing point of the meat product, the meat product will contain substantially all liquid water and no ice crystals. Because the first and second meat products used in the present mixing method may be different products, the freezing points of the two materials may be somewhat different.

In the preferred form of the invention the pieces of frozen first meat product in the intermediate combination are smaller than the pieces of the second meat product in the combination. This size relationship between the pieces of first and second meat product in the intermediate combination may be controlled with the grind size used for the meat products before they are introduced into the mixer. That is, the grind/extrusion size of the extruded first meat product is preferably smaller in diameter than the grind size of the second meat product.

The mixing method and mixing apparatus according to the invention produce a final mixed product having a pH that is different from both of the constituent meat products and preferably having a temperature different from the temperature of the constituent meat products. The mixture includes a substantially homogeneous pH and is formed without overly working the meat products.

The final mixed product produced according to the invention is preferably further processed through a final sizing device such as a grinder or bowl chopper. Final sizing may also be accomplished by heavy blending or by pumping or otherwise forcing the product through a conduit. This sizing device further mixes the final mixed product and ensures a desired size of the comminuted pieces making up the product.

These and other objects, advantages, and features of the invention will be apparent from the following description of the preferred embodiments, considered along with the accompanying drawings.

DESCRIPTION OF THE PREFERRED EMBODIMENTS

Figure 1:
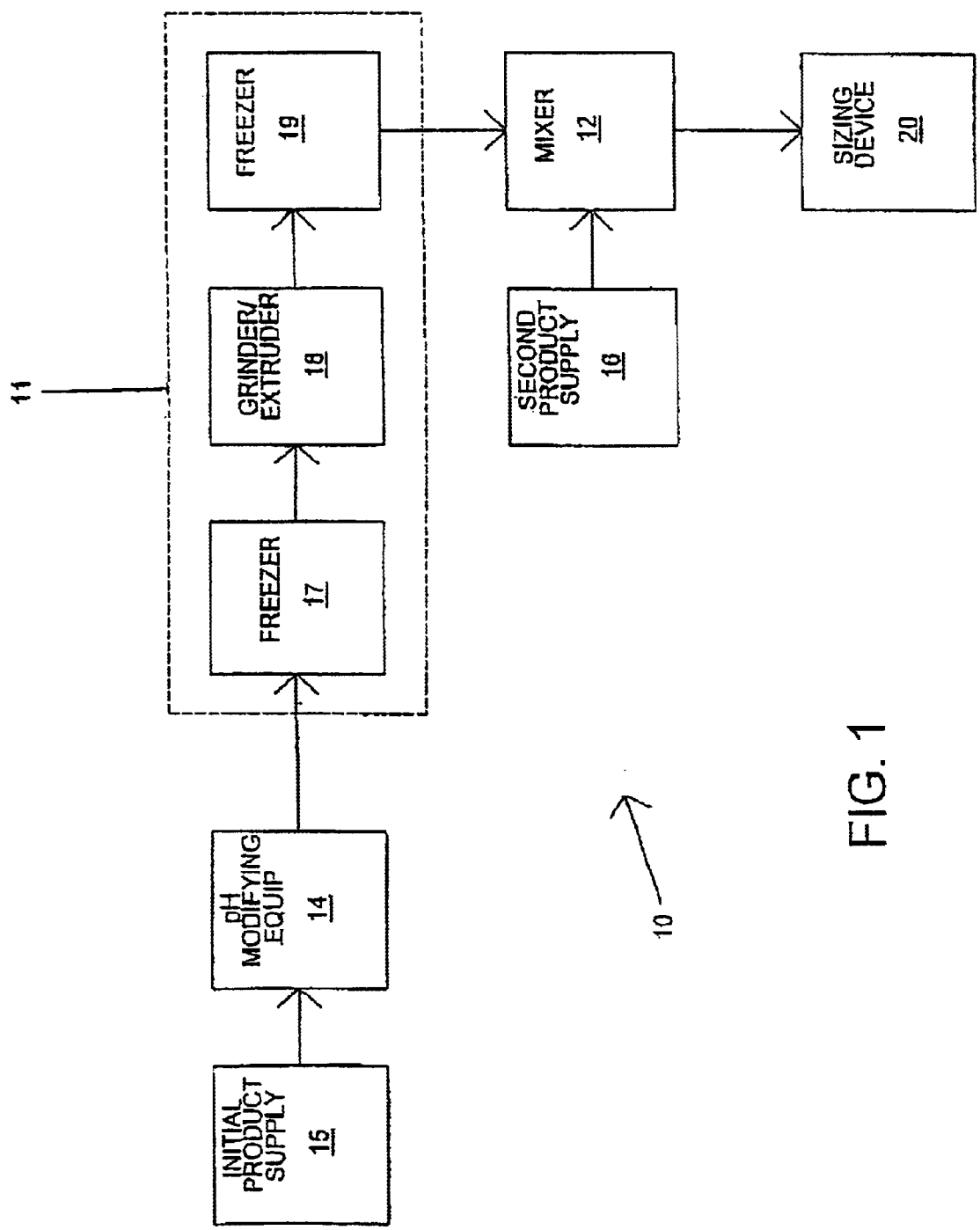
FIG. 1 is a diagrammatic representation of a mixing apparatus embodying the principles of the invention.

Referring to FIG. 1, a mixing system 10 embodying the principles of the invention includes a forming arrangement shown generally at reference numeral 11 and a mixer 12. Forming arrangement 11 forms a first meat product into at least one frozen strand that readily breaks into a plurality of small pieces in mixer 12. Mixer 12 mixes an intermediate combination made up of the frozen pieces of the first meat product and a quantity of a second meat product. This second meat product in the intermediate combination in mixer 12 is at a temperature at or above the freezing point of the second meat product. The mixing action on the intermediate combination in mixer 12 results in a final mixed product having the first meat product evenly distributed through the second meat product.

The apparatus shown in FIG. 1 is well suited for forming a final meat product having an adjusted pH. In this preferred application, the first meat product has a first pH which is different from the pH of the second meat product. The illustrated apparatus therefore includes pH modifying equipment 14 for producing the desired first meat product from an initial meat product received from an initial meat product supply 15. A second meat product supply 16 directs the second meat product directly to mixer 12. It will be appreciated, however, that the particular arrangement shown in FIG. 1 is shown only for purposes of providing an illustrative example. Other apparatus according to the invention may include a pH adjusting arrangement for adjusting the pH of the second meat product in addition to, or in lieu of, any pH modification to produce the first meat product.

Forming arrangement 11 in the apparatus shown in FIG. 1 comprises a freezer 17 which is preferably a roller press type freezer which freezes a comminuted meat product into a thin sheet and then cuts the sheet into small pieces. These small pieces of frozen comminuted meat product are then directed to a grinder 18 which extrudes the meat into at least one elongated strand of the first meat product. The elongated strands are then directed to a second freezer 19 which freezes the elongated strands. Freezer 19 may comprise any freezing device suitable for receiving the elongated strands of material and freezing that material in its elongated shape. For example, freezer 19 may comprise a tunnel freezer or belt freezer.

As mentioned briefly above, forming arrangement 11 shown in FIG. 1 need not cut the elongated frozen strands prior to introduction into mixture 12. Rather, when a frozen strand of first meat product is introduced into mixer 12, and also as the mixer operates, bending forces are applied to the frozen strand which cause the strand to break up into the desired small frozen pieces of material. Thus, in the form of the invention shown in FIG. 1, the small pieces of frozen meat product are actually formed in mixer 12. It will be appreciated, however, that other forms of the invention could produce the small pieces prior to introduction into mixture 12. For example, the cutting arrangement associated with roller press freezer 17 shown in FIG. 1 may cut the sheet of frozen first meat product exiting the drum of the roller press freezer into sufficiently small pieces for introduction into mixer 12. In this alternate form of the invention, grinder 18 and freezer 19 may be omitted.

Where the first meat product is formed into one or more frozen strands, the strands are preferably on the order of 1.5 inches or more in length as they enter mixer 12. Regardless of whether frozen strands are used, it is desirable for the small pieces of first meat product initially in the intermediate combination to be above a minimum size. In particular, it is desirable for the small pieces of frozen first meat product initially in the intermediate combination to have a minimum dimension no less than approximately one-sixteenth (1/16) of an inch.

The desired pH in the first meat product may be produced in any suitable fashion. For example, pH modifying equipment 14 shown in FIG. 1 may comprise equipment for producing a meat product having a naturally higher or lower pH than the second meat product. For example, pH modifying equipment 14 may comprise equipment for producing Lean Finely Textured Beef which has a pH somewhat higher than regular ground beef. In this case, the second meat product may comprise regular ground beef. Alternatively, the pH of an initial meat product may be altered by adding one or more pH modifying materials such as ammonia or carbon dioxide. Ammonia may be applied to increase the pH of a meat product, while carbon dioxide may be used to lower the pH of a meat product. In this alternate form of the invention, pH modifying equipment 14 may comprise a contactor for contacting ammonia with a comminuted initial meat product and then an additional comminuting device such as a grinder for grinding the ammoniated meat product to evenly distribute the ammonia through the material. This type of ammoniating apparatus is shown in U.S. patent application Ser. No. 09/286,699, now U.S. Pat. No. 5,871, 795, the entire content of which is hereby incorporated herein by this reference. The pH modifying equipment 14 may alternatively comprise an apparatus such as that disclosed in U.S. Pat. No. 6,142,067, the disclosure of which is also incorporated herein by this reference.

Mixer 12 may comprise any suitable mixing device suitable for mixing meat products. For example, mixer 12 may comprise a ribbon blender such as the device shown in U.S. Pat. No. 4,733,607. Alternatively, mixer 12 may comprise a paddle type blender which includes one or more paddles mounted in a blender vessel. The paddle or paddles in this type of blender are driven through the vessel to provide a mixing action.

One preferred form of the invention includes a final sizing device 20 adapted to receive the final mixed material removed or ejected from mixer 12. This final sizing device 20 may comprise a grinder or a bowl chopper for example. Final sizing device 20 ensures the product contains comminuted pieces of the desired size and also serves as a quick final mixer.

The mixing method according to the invention may be described with reference to FIG. 2. The method primarily comprises the steps of providing a first meat product as shown at block 30, providing a second meat product as shown at block 31, and then forming an intermediate combination with the first and second meat products as shown at block 32. The intermediate combination comprises a plurality of frozen pieces of the first meat product along with a quantity of the second meat product which is at a temperature at or above its freezing point, and more preferably above its freezing point. The basic method then includes mixing the intermediate combination as shown at block 33. This mixing step is preferably performed for a period of time sufficient for all of the frozen first meat product to rise to a temperature above the first meat product freezing point. This mixing time will depend primarily upon the respective temperatures of the first and second meat products.

Figure 2:
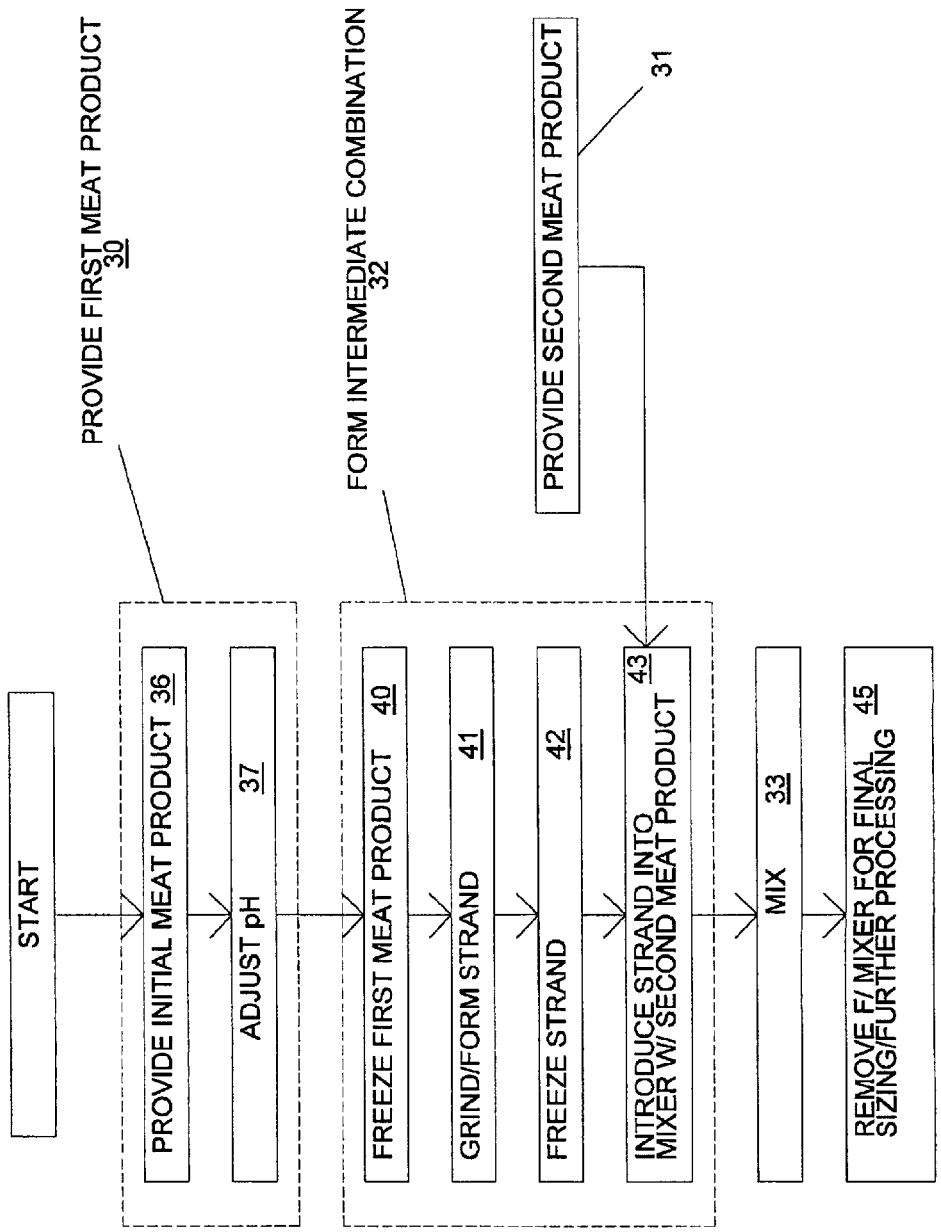
FIG. 2 is a process flow chart showing the method steps performed according to the invention.

In the preferred form of the invention, providing the first meat product includes providing an initial meat product as indicated at block 36 in FIG. 2, and then adjusting the pH of the initial meat product as shown at block 37. The pH adjustment step may comprise a process such as forming Lean Finely Textured Beef. Alternatively, pH adjusting step 37 may comprise a process in which a pH modifying material such as ammonia is added to a meat product to increase the pH the initial product, or a process in which a pH reducing material such as carbon dioxide is added to the initial meat product. In either case, the pH modifying material may be added to the initial meat product and then the material may be further comminuted to distribute the pH modifying material evenly to produce the desired pH in the product.

The step of forming the intermediate combination shown at block 32 includes a series of individual steps needed to produce the plurality of frozen pieces of the first meat product. Although there are many different ways to produce the desired small frozen pieces of the first meat product, the preferred forming method includes freezing the pH adjusted first meat product as shown at block 40 in FIG. 2 and then placing the resulting frozen first meat product in a condition for processing through a grinder/extruder such as device 18 shown in FIG. 1. The pH adjusted meat product is then ground and extruded as shown at block 41 to form at least one elongated strand of the first meat product. This preferred grind/extrusion step takes the first meat product from a temperature below its freezing point and preferably approximately zero degrees Fahrenheit to a temperature near its freezing point at the outlet of the grinder/extruded. This grinder outlet temperature may be approximately 23 to 28 degrees Fahrenheit. As shown at process block 42 the method then includes freezing the elongated strand or strands of extruded material to a lower temperature preferably no greater than 20 degrees Fahrenheit (and more preferably around zero degrees Fahrenheit), and then introducing the strand or strands into the mixer (12 in FIG. 1) along with the quantity of unfrozen second meat product as shown at block 43. The temperature of the second meat product in the intermediate combination may be approximately 33 to 42 degrees Fahrenheit for example. Bending forces applied to the frozen strand or strands as upon introduction into the mixer and the further bending forces applied during mixing cause the strands to break up into the desired plurality of small frozen pieces of first meat product.

The individual pieces of frozen first meat product in the intermediate combination are preferably smaller in cross section than the comminuted material comprising the second meat product. For example, the grinder (18 in FIG. 1) used to produce the strands in step 41 may produce strands approximately one-quarter inch in diameter while the second meat product in the intermediate combination may be at three-eighths inch in diameter or larger.

Mixing the intermediate combination as shown at process block 33 causes the frozen pieces of first meat product to become evenly distributed throughout the intermediate combination. Then, as the frozen pieces begin to thaw, the first meat product commingles with the second meat product to form a final mixed product. This final mixed product comprises a mixture of the first and second meat products having a substantially uniform pH different from both the pH of the first meat product and the pH of the second meat product, and having a temperature higher than the temperature of the frozen first meat product introduced into the mixer, but usually lower than the temperature of the second meat product introduced into the mixer. The temperature of the final mixed meat product may be approximately 33 degrees Fahrenheit for example. This material is removed from the mixer as shown at process block 45 for final sizing as necessary and then packaging or further processing.

Final sizing may be performed in a device such as device 20 in FIG. 1, comprising a grinder, bowl chopper, or similar comminuting device. This device not only ensures a proper grind size for the final mixed product but also performs a rapid final mix of the material without overly working the material.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A method for mixing meat products, the method including the steps of:
    (a) providing a comminuted first meat product having a first pH;
    (b) providing a comminuted second meat product having a second pH different from the first pH;
    (c) forming an intermediate combination comprising a quantity of the second meat product at a temperature at or above the freezing point of the second meat product and a plurality of pieces of the first meat product at a temperature below the freezing point of the first meat product; and
    (d) mixing the intermediate combination.

2. The method of claim 1 wherein the step of providing the first meat product includes the steps of:
    (a) forming a quantity of the first meat product into at least one elongated strand; and
    (b) reducing the temperature of the elongated strand to the temperature below the freezing point of the first meat product.

3. The method of claim 2 further including the step of:
    (a) breaking the elongated strand of the first meat product at the temperature below the freezing temperature of the first meat product into a plurality of pieces.

4. The method of claim 3 wherein the step of breaking the elongated strand of first meat product into the plurality of pieces includes the step of:
    (a) applying bending force to the elongated strand of frozen first meat product at points along the length of the strand.

5. The method of claim 4 wherein at least a portion of the bending force to the elongated strand of frozen first meat product is applied by contact with the second meat product.

6. The method of claim 1 wherein the step of mixing the intermediate combination includes:
    (a) mixing the intermediate combination until substantially all of the first meat product in the intermediate combination reaches a temperature above the freezing point of the first meat product.

7. The method of claim 1 wherein the temperature of the first meat product pieces in the intermediate combination at the time the intermediate combination is formed comprises a temperature no greater than 20 degrees Fahrenheit.

8. The method of claim 1 wherein the temperature of the second meat product in the intermediate combination at the time the intermediate combination is formed is between approximately 33 degrees Fahrenheit and 65 degrees Fahrenheit.

9. The method of claim 2 wherein the step of forming the first meat product into at least one elongated strand includes the steps of:

(a) forcing the quantity of first meat product through a grinder screen having at least one grinder screen opening.

10. The method of claim 9 wherein the step of forcing the first meat product through the grinder screen raises the temperature of the first meat product from a temperature no greater than zero degrees Fahrenheit to a temperature between 23 to 28 degrees Fahrenheit.

11. The method of claim 10 further including the step of reducing the temperature of the first meat product to a temperature no greater than 20 degrees Fahrenheit after forcing the first meat product through the grinder screen and before forming the intermediate combination.

12. The method of claim 9 wherein the grinder screen opening is approximately one-quarter inch in diameter and wherein the second meat product is made up of a comminuted meat product which has been comminuted at a grind size greater than one-quarter inch.

13. The method of claim 1 wherein the first meat product comprises a pH modified meat product.

14. The method of claim 13 further including the step of:
(a) adding a pH modifying material to an initial meat product to produce the pH modified first meat product.

15. The method of claim 14 wherein the pH modifying material comprises ammonia.

16. The method of claim 1 wherein the first meat product comprises Lean Finely Textured Beef and the second meat product comprises ground beef.

17. The method of claim 1 wherein the plurality of pieces of frozen first meat product have a first cross sectional dimension and the second meat product is made of pieces of meat having a maximum cross sectional dimension larger than the first cross sectional dimension.

18. A method for mixing meat products, the method including the steps of:
(a) forming an intermediate combination comprising a plurality of pieces of a first meat product at a temperature below the freezing point of the first meat product and a quantity of a second meat product at a temperature at or above the freezing point of the second meat product, the first meat product having a first pH and the second meat product having a second pH different from the first pH; and
(b) mixing the intermediate combination.

19. The method of claim 18 further including the following steps prior to forming the intermediate combination:
(a) forming a quantity of the first meat product into at least one elongated strand; and
(b) reducing the temperature of the elongated strand to the temperature below the freezing point of the first meat product.

20. The method of claim 19 further including the step of:
(a) breaking the at least one elongated strand of the first meat product at the temperature below the freezing temperature of the first meat product into a plurality of pieces.

21. The method of claim 19 wherein the step of forming the first meat product into at least one elongated strand includes the steps of:
(a) forcing the quantity of the first meat product through a grinder screen having at least one grinder screen opening.

22. The method of claim 18 wherein the step of mixing the intermediate combination includes:
(a) mixing the intermediate combination until substantially all of the first meat product in the intermediate combination reaches a temperature above the freezing point of the first meat product.

23. The method of claim 18 further including the step of:
(a) adding a pH modifying material to an initial meat product to produce the first meat product prior to reducing the temperature of the first meat product to the temperature below the freezing point of the first meat product and prior to forming the intermediate combination.

24. The method of claim 18 wherein the plurality of pieces of frozen first meat product have a first cross sectional dimension and the second meat product is made of pieces of meat having a maximum cross sectional dimension larger than the first cross sectional dimension.

* * * * *